US006494975B1

(12) United States Patent
Scrymgeour et al.

(10) Patent No.: US 6,494,975 B1
(45) **Date of Patent: *Dec. 17, 2002**

(54) METHOD OF DISPENSING TICKETS

(75) Inventors: Lyle Scrymgeour, Dugald (CA); Fred Setterington, Barrhead (CA); Mark Topping, Barrhead (CA)

(73) Assignee: Pollard Banknote Limited, Winnipeg (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/877,162

(22) Filed: Jun. 17, 1997

(51) Int. Cl.[7] ............................ B32B 31/00; B65B 9/02

(52) U.S. Cl. ......................... 156/64; 156/157; 156/253; 156/270; 156/308.4; 156/301; 156/506; 53/450; 53/452; 53/477; 283/903

(58) Field of Search .......................... 53/450, 452, 477, 53/64, 65; 156/308.4, 301, 505, 506, 64, 253, 269, 270, 157, 277; 225/32; 283/104, 903; 705/14

(56) References Cited

U.S. PATENT DOCUMENTS 3,140,572 A * 7/1964 Peterson et al. .............. 53/435
4,239,582 A * 12/1980 McGrath .................... 156/505
4,359,358 A * 11/1982 Hattemer .................... 156/248
4,407,443 A 10/1983 McCorkle ...................... 383/5
4,566,922 A * 1/1986 Martinez ..................... 156/64
4,841,712 A * 6/1989 Roou .......................... 53/412
5,053,239 A * 10/1991 Vanhatalo et al. .......... 426/412
5,100,038 A * 3/1992 Schafer ....................... 225/32
5,188,370 A 2/1993 Vlahos ....................... 273/269
5,732,529 A * 3/1998 Dey et al. .................. 53/389.2
5,758,473 A * 6/1998 Patelli ......................... 53/412

OTHER PUBLICATIONS

English abstract and figures of GB 2 304 446 A published Mar. 1997, 2 pages.

* cited by examiner

*Primary Examiner*—Linda Gray
(74) *Attorney, Agent, or Firm*—Adrian D. Battison

(57) ABSTRACT

A lottery product comprises a row of pouches formed by an upper and lower layer of heat sealable plastics material which is sealed along both edges and at spaced transverse heat sealed lines to define a series of separate pouches each containing a lottery ticket. The pouches are perforated in the transverse heat sealed lines to allow separation by tearing. The tickets are numbered consecutively in the row. The pouches are folded at each perforation line so as to form a fan folded structure with each ticket lying on top of the next adjacent ticket. A tear notch is provided at the top of each pouch between the heat seal and the top of the ticket to allow transverse tearing to remove the ticket from the pouch. The row of tickets is supplied in a dispensing machine and the strength of the perforations and the tear notch is arranged so that the row can remain intact while it is dispensed and can be easily manually separated without effecting tearing at the notch. To correct mistakes in the numbering, the pouches are separated and are rejoined by a transverse adhesive tape which has a row of perforations along the center of the tape.

5 Claims, 3 Drawing Sheets

METHOD OF DISPENSING TICKETS

BACKGROUND OF THE INVENTION

This invention relates to a pouched lottery ticket and to a method for dispensing the lottery tickets.

Lottery tickets are well known and widely sold and generally comprise a sheet material of paper or card stock on which is printed lottery information and various indicia for the playing of one or more games. Many such games are instant win type games where the player can "play" the game or games by carrying out various functions. Such lottery tickets generally include information such as ticket numbers which identify the ticket for the purposes of security and control.

One practice which has become prevalent in Canada is to sell such lottery tickets in a pouch which is formed from two layers which are sealed around the edge of the pouch so that the lottery ticket is sandwiched between the two layers.

This technique provides a number of advantages as follows:

a) The sealing of the lottery ticket within a closed pouch allows increased security for maintaining integrity of the ticket.

b) The pouch provides a higher perceived value for the product without significantly increasing the cost of production. This allows in many cases the product to be purchased as a gift.

c) The pouch allows the ticket to be more complex including a number of different sheets so as to increase the variety and number of games which can be played on the ticket.

d) The layers forming the pouch can be metalized so as to provide a highly attractive appearance carrying bold colors and a high level of promotional information.

e) The ticket contained within the pouch can be of a single sheet or can be folded multiple sheet as required.

f) The pouches also have a clear window allowing bar code verification by reading the bar code printed on the ticket within the pouch.

The dimensions of the pouch are generally between 3½ and 4 inches wide and of the order of 5 to 6 inches in length.

These pouches have achieved significant success in the Canadian marketplace. However the pouches have not been available up till now in U.S.A. and therefore the U.S. marketplace has not had the advantages as set forth above which enable a significant increase in sales of this product.

In the U.S. marketplace lottery tickets are often sold in a vending machine in which the lottery tickets form from simple paper stock are printed and formed in a row with the paper stock perforated transversely to form a continuous row of tearable lottery tickets.

SUMMARY OF THE INVENTION

It is on object of the present invention to provide an improved lottery ticket product particularly designed for the U.S. marketplace which provides the advantages of the above pouch product.

According to one aspect of the invention there is provided an apparatus for use in a lottery comprising:

a plurality of ticket portions each formed by substantially flat substrate sheet material having lottery indicia printed thereon;

a plurality of pouches each surrounding and containing a respective one of the ticket portions;

each pouch comprising an upper flat layer and a bottom flat layer with the ticket portion sandwiched between the layers;

the layers being connected along side edges thereof by at least one longitudinal seal and being connected at a front transverse edge by a first transverse seal and a rear transverse edge by a second transverse seal so as to fully envelop the ticket portion;

the pouches being arranged in a single row such that the rear edge of one pouch is attached to the front edge of a next adjacent pouch at a junction therebetween and such that the upper flat layer and the bottom flat layer are substantially continuous along the row;

each junction between the pouches having arranged across the pouches at the junction a row of perforations through the upper and bottom flat layers to allow torn separation of one pouch from the next;

the row of pouches being folded along each of the rows of perforations with the fold at the front edge of each pouch being in a direction opposite to the fold at the rear edge of each pouch so that the pouches lie each on top of and parallel to the next.

The layers may be formed from a plastics material of a type which allows the seals to be formed simply by heat sealing, however other materials may be used, for example paper/polyethylene laminated to polyethylene and other methods of sealing such as cold sealing can be used.

Preferably the length of each pouch from the row of perforations at the front edge to the row of perforations at the rear edge is consistent with the length of each of the other pouches to a tolerance less than 0.1 inch and preferably the tolerance is less than 0.005 inch.

Preferably the transverse seal at the front edge of one pouch forms a common single transverse seal with the seal at the rear edge of the next adjacent pouch and wherein the row of perforations is arranged in the common seal.

Preferably the apparatus includes tear means for initiating a tear in the pouch at a position adjacent to but spaced longitudinally from one of the seals at the front and rear edges.

Preferably the tear means has a strength relative to the row of perforations such that longitudinal pulling of the pouches adjacent the tear means causes separation by tearing of the row of perforations without effecting tearing at the tear means.

Preferably, at a junction between one pouch and a next adjacent pouch in the row of pouches, the upper layer and the bottom layer are separated between the pouches and the pouches are joined by a strip of tape adhesively attached across the pouches at the junction, the strip being perforated at the junction. This allows pouches which become separated by error or in order to change the sequence to be re-joined.

Preferably each ticket portion of the row of pouches has a ticket number with the ticket numbers being consecutive from a first pouch in the row to a last pouch in the row.

Preferably each ticket portion of the row of pouches carries a book number which is the same number for each ticket portion of the row.

According to a second aspect of the invention there is provided a method of dispensing tickets for use in a lottery comprising:

providing a plurality of ticket portions each formed by substantially flat substrate sheet material having lottery indicia printed thereon;

providing a plurality of pouches each surrounding and containing a respective one of the ticket portions;

each pouch comprising an upper flat layer and a bottom flat layer with the ticket portion sandwiched between the layers;

connecting the layers along side edges thereof by at least one longitudinal seal and connected at a front transverse edge by a first transverse seal and a rear transverse edge by a second transverse seal so as to fully envelop the ticket portion;

arranging the pouches in a single row such that the rear edge of one pouch is attached to the front edge of a next adjacent pouch at a junction therebetween and such that the upper flat layer and the bottom flat layer are substantially continuous along the row;

providing at each junction between the pouches across the pouches at the junction a row of perforations through the upper and bottom flat layers to allow torn separation of one pouch from the next;

folding the row of pouches along each of the rows of perforations with a fold at the front edge of each pouch being in a direction opposite to a fold at the rear edge of each pouch so that the pouches lie each on top of and parallel to the next;

locating the row of folded pouches in a dispensing machine and dispensing from the machine at least one pouch, said at least one pouch being torn at the row of perforations thereof from a remaining portion of the row of pouches.

Preferably the row of perforations is arranged such that the row of pouches has sufficient strength to pass through the dispensing machine and such that it is sufficiently tearable that the pouches can be readily separated by manual or automatic tearing.

Preferably the rows of perforations are arranged such that the strength of each row is substantially consistent with that of the next row.

Preferably the length of each pouch from the row of perforations at the front edge to the row of perforations at the rear edge is consistent with the length of each of the other pouches to a tolerance less than 0.1 inch.

Preferably the tolerance is less than 0.005 inch.

Preferably the transverse seal at the front edge of one pouch forms a common single transverse seal with the seal at the rear edge of the next adjacent pouch and wherein the row of perforations is arranged in the common seal.

Preferably the method includes providing tear means for initiating a tear in the pouch at a position adjacent to but spaced longitudinally from one of the seals at the front and rear edges.

Preferably the tear means has a strength relative to the row of perforations such that longitudinal pulling of the pouches adjacent the tear means causes separation by tearing of the row of perforations without effecting tearing at the tear means.

Preferably the method includes separating at least two pouches by tearing at the row of perforations at the junction therebetween and joining a first pouch to a second pouch by a strip of tape adhesively attached across the first and second pouches at the junction, the strip of tape being perforated at the junction.

Preferably the strip is cut from a portion of a continuous tape which is perforated longitudinally.

Preferably each ticket portion of the row of pouches has a ticket number and wherein the pouches are separated and joined such that the ticket numbers are consecutive from a first pouch in the row to a last pouch in the row.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
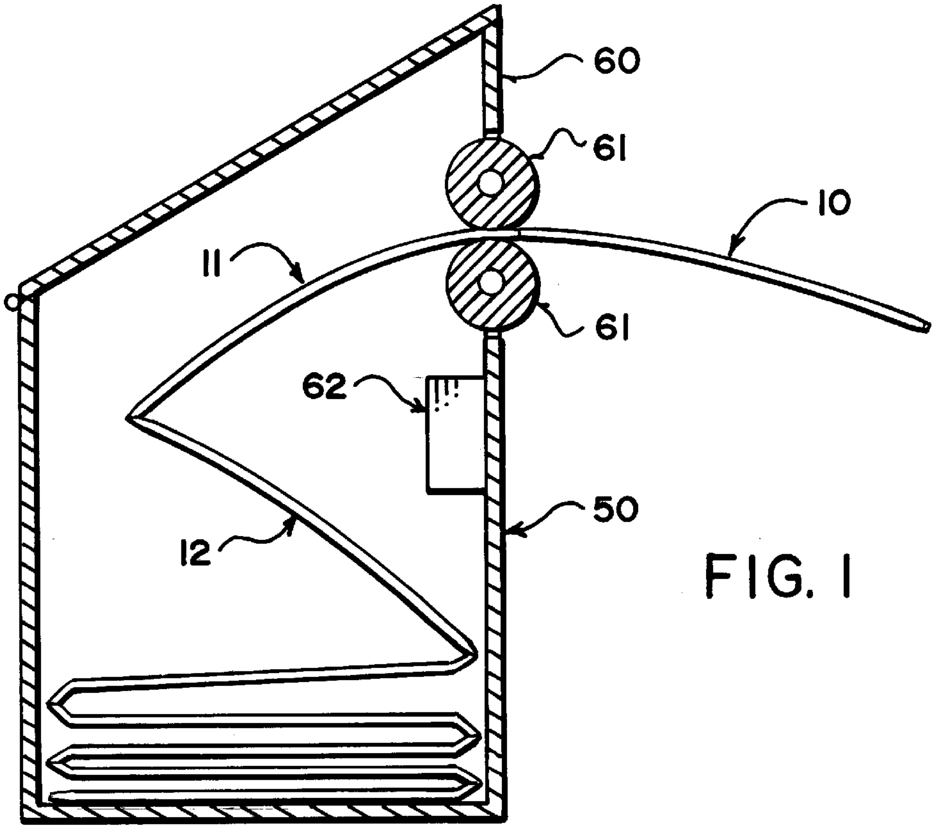
FIG. 1 is a schematic side elevational view of an apparatus for dispensing pouched lottery tickets of the type disclosed herein.

A pouched lottery ticket arrangement is shown in the figures and comprises a row of pouches 10, 11, 12, etc. with each pouch containing a lottery ticket portion 13 stored and contained within the pouch.

The pouches are formed by a top sheet 14 and a bottom sheet 15 of a heat sealable plastics material. The plastics material is preferably a laminate of polyester and polyethylene with the latter providing a layer on an inside surface for heat sealing to the similar layer on the opposite sheet. The polyester material allows the possibility for metalizing the outside surface so as to carry brightly colored printing of a promotional nature.

The sheets 14 and 15 are overlaid so as to define coterminous side edges 16 and 17 and are heat sealed in a band 18 adjacent those side edges so that the two sheets are sealed together along the side bands 18. The width of the band is sufficient to ensure a seal which prevents penetration through the seal so that the ticket 13 inside the pouch remains intact except when the pouch is opened.

Figure 2:
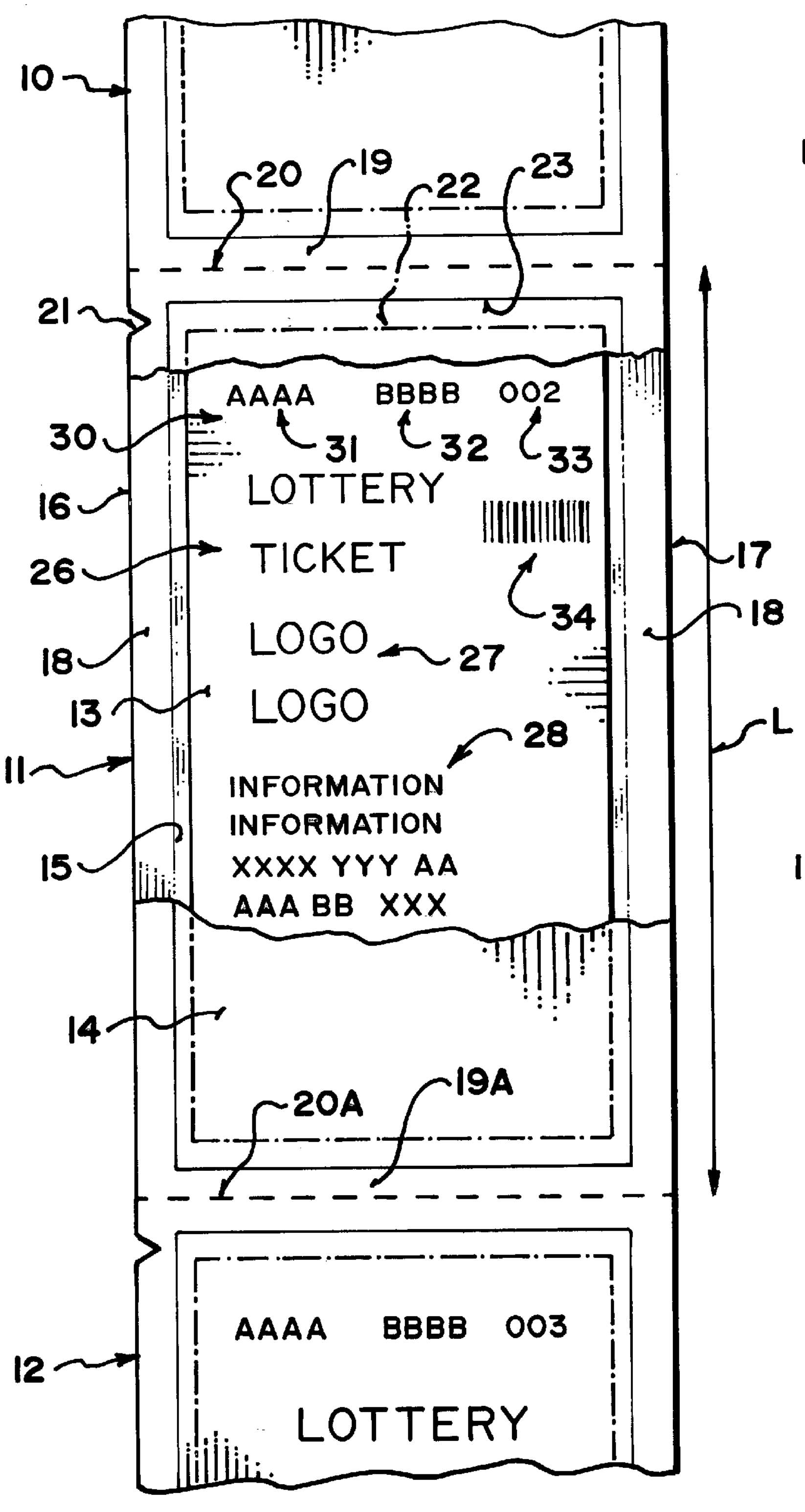
FIG. 2 is a front elevational view of the pouched lottery ticket of FIG. 1.
Figure 3:
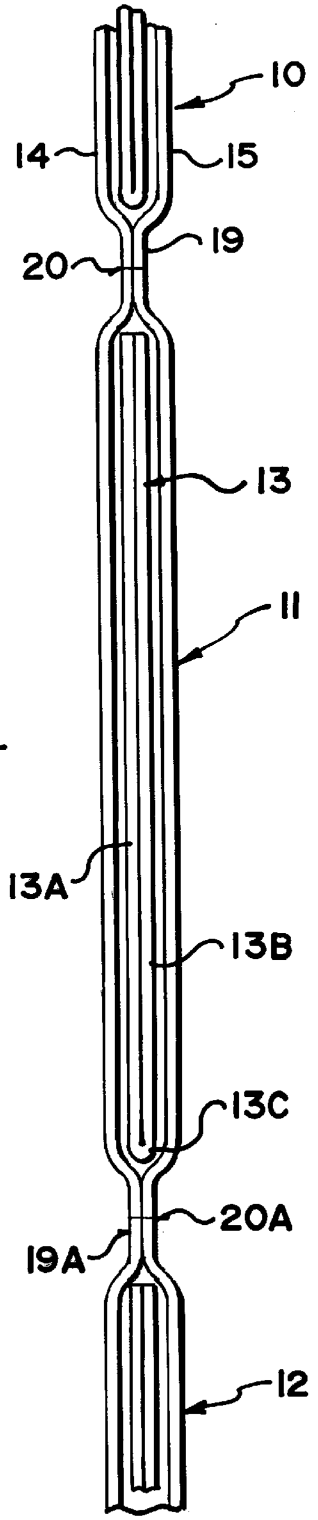
FIG. 3 is a cross sectional view of the pouched lottery ticket of FIG. 2.

The pouches are separated each from the next by a transverse heat seal 19 so that the first pouch 10 is separated from the second pouch 11 by the transverse heat seal 19, so that the second pouch 11 is fully closed by the first transverse heat seal 19 and the second transverse heat seal 19A and so that the second pouch 11 is separated from the third pouch 12 by the transverse heat seal 19A. It will be appreciated that the construction is substantially continuous so that the pouches are arranged in a row end to end and only three of the pouches are shown in FIG. 2 for convenience of illustration. The number of pouches in the row can be selected in accordance with the requirements.

The ticket portion 13 as shown comprises a pair of folded sheets 13A and 13B folded at a hinge line 13C at one end of the pouch. The ticket portion can comprise a simple flat sheet or can comprise a number of folded sheets depending upon the games that are intended to be marketed within the pouch.

The ticket portions and the pouches are assembled on a manufacturing line which supplies in rolled form the upper sheet and the lower sheet and the tickets are supplied along a conveyor to be placed in position in a row on these sheets prior to heat sealing of the sheets. The sheets are then heat sealed along the side edges and heat sealed from the transverse seals so that each ticket portion is then encased and enclosed within its own separate pouch.

The pouches are tearable one from the next by transverse rows of perforations indicated at 20, 20A, 20B etc. These perforations are arranged across the pouches and lie within the transverse heat seal 19, preferably approximately midway along the heat seal 19. The perforations are formed by punched cutters which form a series of slots separated by bridges.

Figure 6:
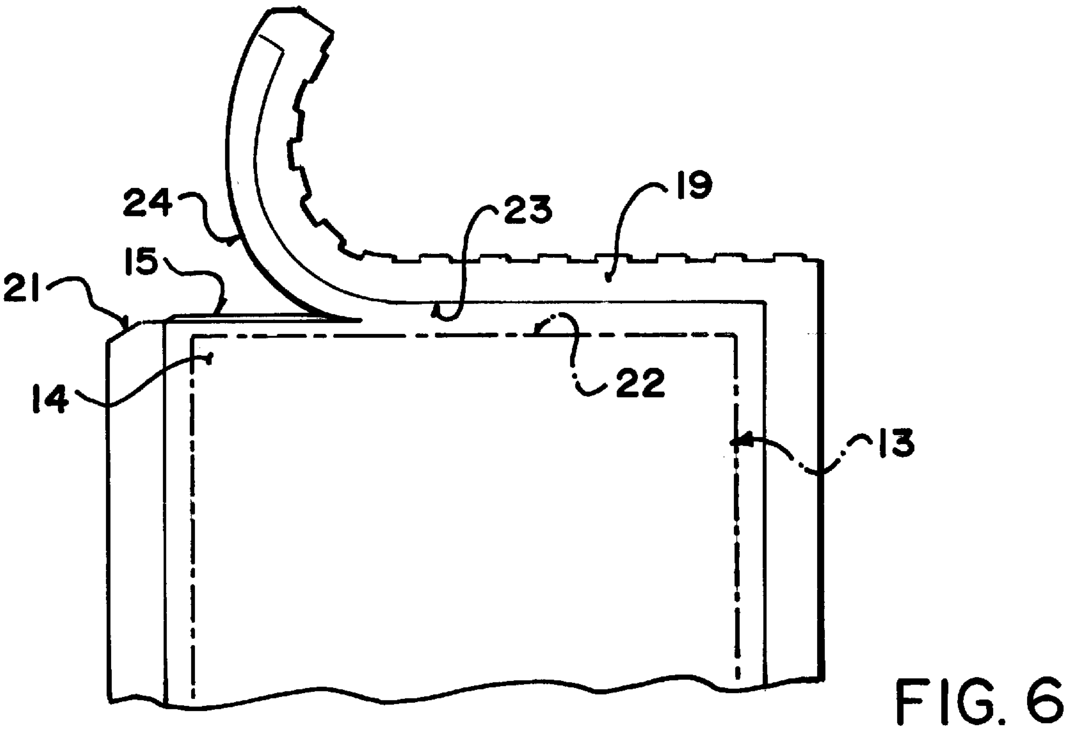
FIG. 6 is a front elevational view similar to that of FIG. 5 showing the opening by tearing of the pouch.

Each pouch includes a notch 21 adjacent its top edge but spaced downwardly from the transverse heat seal 19. The notches located above the top edge 22 of the ticket portion. The length of the ticket portion is such that the ticket portion is received within the pouch but spaced inwardly from the side edges of the pouch at the heat seal 18 and from the top and bottom edges of the pouch at the heat seal 19. The notches thus aligned with a space between the top edge 22 of the ticket and a bottom edge 23 of the heat seal 19. When pulled transversely therefore as shown in FIG. 6, the pouch can be torn as indicated at 24 with the tear line being guided by the bottom edge 23 of the heat seal and the top edge 22 of the ticket portion so as to tear away the top edge of the pouch exposing the top edges of the sheets 14 and 15 to allow the sheets to be opened and the ticket portion 13 pulled from the open top edge of the pouch. Each ticket portion carries information generally indicated at 26 including logos 27 and information relating to the games to be played as indicated at 28 which is printed on the ticket portion and exposed when the ticket portion is removed from the pouch.

The details of the information can of course vary in accordance with the requirements and therefore the information is shown only schematically. Each ticket portion however includes a code number generally indicated at 30 which includes three code portions 31, 32 and 33. The code portions are printed at some suitable location on the ticket portion and are exposed therefore for viewing when the ticket portion is removed. These codes numbers can also be applied as a bar code so as to be machine readable as indicated schematically at 34.

The separate code portions 31, 32 and 33 comprise respectively a strip number, book number and ticket number. The book number 32 constitutes a number which is used on each of the tickets of the row of tickets so as to identify the "book" of the tickets defined by the completed row of tickets.

The ticket number is applied to each of the tickets consecutively so that the second ticket in the second pouch 11 is identified as ticket 002 and the third ticket in the third pouch 12 is indicated at 003. It will be appreciated that by extrapolation, the first ticket is identified as 001 and the remaining tickets are similarly identified with consecutive Arabic numerals.

The tickets are printed in sequence and are collated for transport along the assembly conveyor so that the tickets are arranged numerically in sequence for application into the pouches.

It is however well known that the collation of the tickets in a particular order can fail due to mechanical or human error leading to a situation where certain tickets are omitted from a sequence or tickets from another book are inserted in an otherwise complete sequence. It is always necessary, therefore, that a book of tickets be checked either visually by a person or by a machine reader which scans the codes 34.

In the event that any errors are found, it is necessary to correct those errors by extracting from an otherwise proper sequence those tickets which are improper in the sequence and/or by inserting into a sequence those tickets which are omitted.

It is however an essential part of the present invention that the book of tickets constituted by the row of connected pouches is complete and fully connected throughout its length.

Figure 4:
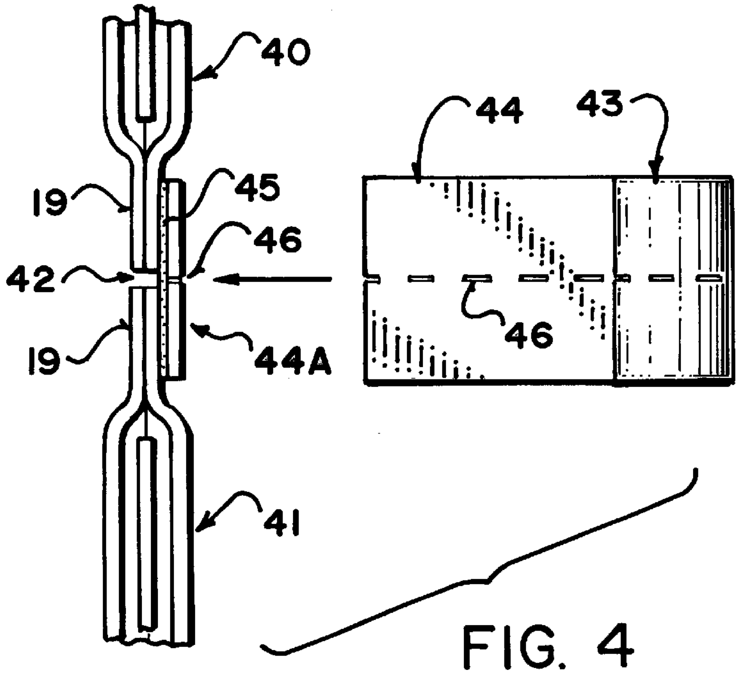
FIG. 4 is a cross sectional view similar to that of FIG. 3 showing the junction between two pouches.

In order therefore to insert or remove tickets, it is necessary therefore to separate the pouches at the row of perforations 20 and to reconnect two pouches edge to edge. This is carried out as shown in FIG. 4 where a first pouch 40 is separated from a second pouch 41 as indicated at 42 and the pouches are reconnected by use of a roll 43 of a tape 44. The tape is an adhesive tape carrying an adhesive layer 45 by which it is bonded to the heat seal 19 of the abutting pouches 40, 41. The tape has a central row 46 of perforations similar to the perforations 20 along the full length of the tape including the portion of tape on the roll 43. The tape is thus unwound to provide a portion 44A of the tape which is of a width equal to the width of the pouches which is then attached along one side of the pouches at the heat seal 19 over the separation point 42 so that the perforation row 46 is applied directly at the separation 42 and covers the separation 42 thus bonding the two pouches together in a manner which substantially matches the attachment of the pouches in the original manufacturing process.

By this technique therefore of separating pouches and by reconnecting pouches it is possible to correct errors in the sequencing of the tickets so that the completed row or book of tickets is complete and properly consecutive.

When the row of pouches is thus completed, the row is then folded so that each row of perforations is creased along the length of the row to provide a fold line allowing the next adjacent pouch to fold to lie parallel to the first pouch. The fold at the front edge of each pouch is arranged to be opposite to the fold at the rear edge of each pouch so as to provide a "fan folding" action in which the pouches each on top of the next folded back and forth in a stack.

In order to obtain this fan folding action, it is necessary that the length L of each pouch from the row 20 of perforations at the front edge to the row 20A of perforations at the rear edge is substantially exactly consistent throughout the pouches. Thus the length L must be the same within a tolerance less than 0.1 inch and preferably less than 0.005 inch.

It will be appreciated that the fan folding of paper stock is relatively simple since the paper stock tends to crease or fold at the perforation line. However it has been found that the fan folding of plastics material, which is preferably used for the pouch, is extremely difficult since there is no tendency of the material to crease or fold at the perforation line but instead the material can crease or fold at any position along its length with no preference to the perforation row. It has been found therefore that it is necessary for the length of the pouches to be within the above tolerance so that the folding action can occur directly at the row of perforations without variation. Furthermore it has been found that the length of the pouches can vary in manufacture due to the application of heat necessary for the heat bonding. Attention is therefore necessary to obtain the above tolerances despite the tendency of the materials to stretch during processing.

As shown in FIG. 1, the row of pouches in the fan folded orientation is mounted with a receptacle 50 having a front wall 60 presented toward a purchaser of the tickets. The front wall carries dispensing means in the form of a pair of nip rollers 61 through which the row of pouches is fed. In an automated system, a money receptacle 62 is provided by which the purchaser can supply the necessary funds to purchase one or more tickets. When the funds are so supplied, a control system actuates the rollers to dispense one or more pouches which are then presented forwardly of the rollers for manual tearing at the row of perforations by the purchaser or the control system actuates an automatic tearing operation for presenting the torn ticket to the purchaser.

The vending machine shown in FIG. 1 is only one example of similar such dispensing machines which are presently available, the details of which vary and therefore the machine is only shown schematically. In some cases the number of pouches required is separated by the machine by a pulling action on the perforations providing a tearing at the perforations.

Figure 5:
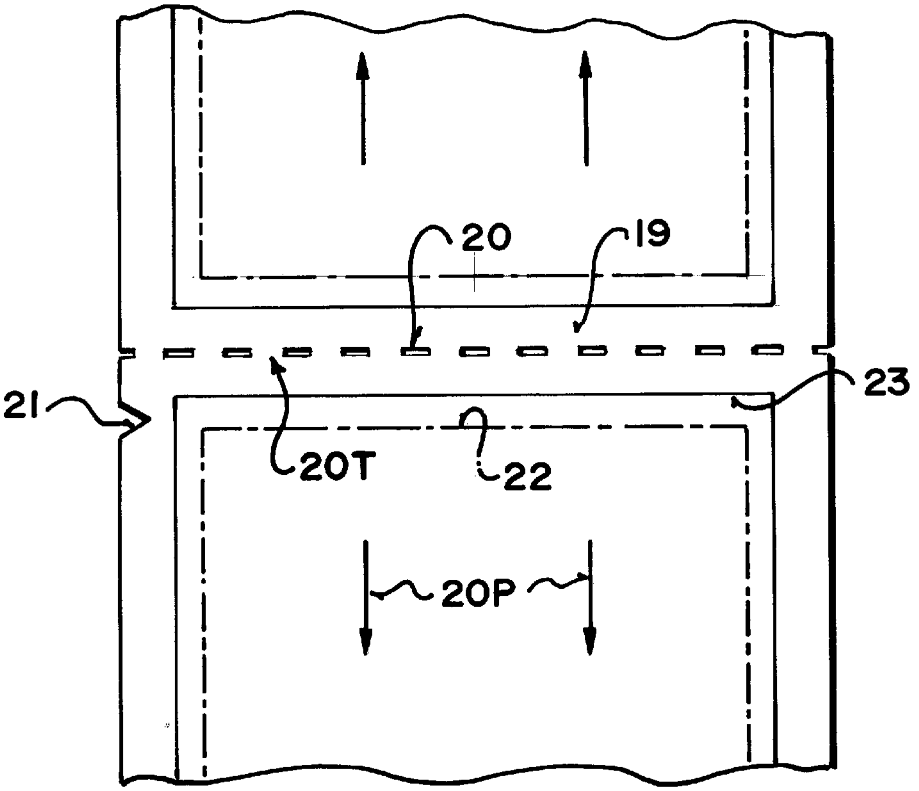
FIG. 5 is a front elevational view similar to that of FIG. 2 showing the separation by tearing of two of the pouches.

The manufacture of the product requires careful attention so that the longitudinal pulling strength of the rows 20 of perforations is accurately consistent throughout the product. Furthermore the strength of the rows of perforations is arranged so that the perforations can resist the forces involved in storing and manipulating the product for dispensing in the dispensing machine. Thus the perforations have sufficient strength so that no tearing occurs during such handling and thus the product remains intact until it is required to be separated by tearing at the perforations. In addition the strength of the perforations such that the pouches can be readily separated by a longitudinal pulling action as shown in FIG. 5, so that the longitudinal pulling action effects tearing along the row 20 of perforations as indicated at 20T. The strength of the perforations is preferably arranged so that the pouch provides a burst strength at the perforations in the range 7 to 12 lbs/in.

Furthermore the arrangement of the notch 21 is selected so that the longitudinal pulling forces indicated at 20P provide the tearing action at 20T rather than a tearing at the notch 21. The notch 21 therefore must be arranged so that the pouch provides a burst strength at the notch in the range 18 to 20 lbs/in in order to obtain the tearing action as shown in FIG. 6.

The pouch is shown and described as having two parallel heat seals defining the side edges. However a pouch having one side edge defined by a fold is also possible so that there is only one longitudinal heat seal.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method of selling lottery tickets to the public comprising:

providing a plurality of individual ticket portions each formed by at least one sheet of a substantially flat substrate sheet material having lottery indicia printed on at least one surface of said at least one sheet, the ticket portions being supplied such that each ticket portion is separate from the next and such that the ticket portions are arranged in a row;

the lottery indicia of said ticket portions in the row including a series of ticket numbers arranged in consecutive sequence with each number being applied to a respective one of the ticket portions;

placing the ticket portions between an upper flat longitudinally extending layer and a bottom flat longitudinally extending layer with the ticket portions sandwiched between the layers;

at least one of the layers having promotional indicia printed on an surface thereof facing outwardly of the ticket portions;

the ticket portions being placed such that the ticket portions are spaced each from the next in a direction longitudinally of the layers;

forming the pouches in a row of the pouches by connecting the layers along side edges thereof by at least one longitudinal seal and by dividing each of said pouches from a next adjacent one of the pouches in the row by forming at a front transverse edge of each said pouch a first transverse seal and at a rear transverse edge a second transverse seal so as to fully envelop the ticket portion such that the ticket portions are loosely positioned between the layers;

the pouches thus being arranged in a single row such that the rear edge of one pouch is attached to the front edge of a next adjacent pouch at one of the transverse seals and such that the upper flat layer and the bottom flat layer are substantially continuous along the row;

providing a notch in one side edge of each said pouch for initiating a tear across said pouch at a position adjacent to but spaced longitudinally from one of said transverse seals such that the pouch can be torn from the notch across one end to form an open mouth of the pouch adjacent to said one end seal;

the ticket and the pouch thus being arranged such that the ticket can be caused to slide out of the open mouth;

providing at each of said transverse seals between the pouches a row of perforations extending across the pouches through the upper and bottom flat layers to allow separation at the perforations of one pouch from the next;

each said pouch being arranged such that it has a strength at the notch thereof relative to a strength at the row of perforations between said pouch and a next adjacent pouch such that longitudinal pulling of the pouches adjacent the notch causes separation at the row of perforations without effecting tearing at the notch;

folding the row of pouches to form a fold line along each of the rows of perforations such that the fold line coincides with the row of perforations with a fold line at the front edge of each said pouch being in a direction opposite to a fold line at the rear edge of each said pouch so that the pouches are fan folded to lie each on top of and parallel to the next;

locating the row of folded pouches in a dispensing container in a public place for dispensing of the pouches as they are released from the container to the public;

and dispensing from the container at least one pouch, said at least one pouch being separated at a respective one of the rows of perforations thereof from a remaining portion of the row of pouches which remains within the dispensing machine.

2. The method according to claim 1 wherein the length of each said pouch from the row of perforations at the front edge to the row of perforations at the rear edge is consistent with the length of each of the other said pouches to a tolerance less than 0.1 inch.

3. The method according to claim 2 wherein said tolerance is less than 0.005 inch.

4. The method according to claim 1 wherein the transverse seal at the front edge of each said pouch forms a common single transverse seal with the transverse seal at the rear edge of the next adjacent pouch and wherein the row of perforations is arranged in the common seal.

5. The method according to claim 1 including separating one of said pouches from a next adjacent one of said pouches by tearing of the row of pouches at the row of perforations therebetween, changing an order of the row of pouches so as to place the ticket numbers in consecutive sequence and joining a first pouch of the row of pouches to a second pouch of the row of pouches by a strip of tape adhesively attached across the first and second pouches at the row of perforations thereof, the strip of tape being cut from a portion of a continuous tape which is perforated longitudinally to provide a row of perforations.

* * * * *